United States Patent
Wang et al.

(10) Patent No.: US 11,954,530 B2
(45) Date of Patent: Apr. 9, 2024

(54) METHOD AND SYSTEM OF PROCESSING DATA BASED ON QUIC PROTOCOL STACK, DEVICE AND STORAGE MEDIUM

(71) Applicant: SHANGHAI BILIBILI TECHNOLOGY CO., LTD., Shanghai (CN)

(72) Inventors: Sheng Wang, Shanghai (CN); Quan Zhou, Shanghai (CN); Shangzhi Cai, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 440 days.

(21) Appl. No.: 17/425,636

(22) PCT Filed: Dec. 25, 2019

(86) PCT No.: PCT/CN2019/128464
§ 371 (c)(1),
(2) Date: Jul. 23, 2021

(87) PCT Pub. No.: WO2020/151449
PCT Pub. Date: Jul. 30, 2020

(65) Prior Publication Data
US 2022/0091892 A1 Mar. 24, 2022

(30) Foreign Application Priority Data
Jan. 25, 2019 (CN) .......................... 201910074772.2

(51) Int. Cl.
*G06F 9/50* (2006.01)
*H04L 69/00* (2022.01)
*H04L 69/16* (2022.01)

(52) U.S. Cl.
CPC ............ *G06F 9/5027* (2013.01); *H04L 69/02* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 8,782,147 B2* | 7/2014 | Ban | H04L 69/32 709/250 |
| 10,397,085 B1* | 8/2019 | Seth | G06F 11/0709 |

(Continued)

FOREIGN PATENT DOCUMENTS

| | | |
|---|---|---|
| CN | 102789394 A | 11/2012 |
| CN | 104969533 A | 10/2015 |

(Continued)

OTHER PUBLICATIONS

International Patent Application No. PCT/CN2019/128464; Int'l Search Report; dated Mar. 19, 2020; 2 pages.

(Continued)

*Primary Examiner* — Craig C Dorais
(74) *Attorney, Agent, or Firm* — BakerHostetler (57) ABSTRACT

The present disclosure provides a method of processing data based on QUIC protocol stack, the method including: obtaining a connection identifier of a data packet; determining a server program used for processing the data packet, wherein the server program comprises a plurality of worker threads, wherein QUIC protocol stacks run in the plurality of worker threads; determining a corresponding worker thread from the multiple worker threads based on the connection identifier; and distributing the data packet to the corresponding worker thread to make the QUIC protocol stack on the corresponding worker thread process the data packet. The disclosure further provides a system, a computing device (Continued)

and a computer-readable storage medium of processing data based on QUIC protocol stack.

20 Claims, 4 Drawing Sheets

(56) References Cited

U.S. PATENT DOCUMENTS

| | | | |
|---|---|---|---|
| 10,419,466 B2 | 9/2019 | Ferguson et al. | |
| 2010/0027443 A1* | 2/2010 | LoGalbo | H04L 12/189 |
| | | | 370/254 |

FOREIGN PATENT DOCUMENTS

| | | |
|---|---|---|
| CN | 107360268 A | 11/2017 |
| CN | 108965359 A | 12/2018 |
| CN | 109218186 A | 1/2019 |
| WO | WO 2017/167392 A1 | 10/2017 |

OTHER PUBLICATIONS

Wang Jing; "Study and Implementation of Protocol Stack Parallelization"; Xidian University; Thesis; Dec. 2014; 75 pages. (English Abstract on p. 5).

* cited by examiner

METHOD AND SYSTEM OF PROCESSING DATA BASED ON QUIC PROTOCOL STACK, DEVICE AND STORAGE MEDIUM

CROSS-REFERENCE TO RELATED APPLICATION

The present application is a national phase application of PCT international patent application No. PCT/CN2019/128464, filed on Dec. 25, 2019, which claims priority to the Chinese patent application with number CN 201910074772.2, filed on Jan. 25, 2019, entitled "Method and system of processing data based on QUIC protocol stack, device and storage medium". Entire content of the Chinese patent application is incorporated in the present application by reference.

TECHNICAL FIELD

The present invention relates to a technology field of computer, in particular to a method and a system of processing data based on QUIC protocol stack, a device and a storage medium.

BACKGROUND

QUIC (Quick UDP Internet Connections) protocol is a low-latency Internet transport layer protocol based on UDP (User Datagram Protocol) developed by Google. It has many advantages, such as reducing connection delay and avoiding head of line blocking. Based on the advantages of the QUIC protocol, in the prior art, a QUIC protocol stack is configured in a server, and all server programs share the QUIC protocol stack.

However, in the process of implementing the concept of the present invention, the inventor found that the related technology has at least the following defects: usually the CPU used in the server has multiple cores, and only one of the cores of the CPU can be used by a single QUIC protocol stack configured for the server in the prior art when processing data at the same time, the multi-core characteristics of the CPU cannot be fully utilized and the core of the CPU is easily overloaded; and when processing data, all data must be processed by the single QUIC protocol stack, resulting in a very low number of concurrent connections.

SUMMARY

The purpose of the present disclosure is to provide a method and a system of processing data based on QUIC protocol stack, a device and a storage medium, which are used to solve the problem of under-utilizing the multi-core characteristics of the CPU, a certain core of the CPU being overloaded and a very low number of concurrent connections caused by configuring a single QUIC protocol stack for the server in the prior art.

On one aspect of the present disclosure, a method of processing data based on QUIC protocol stack is provided, and the method includes: obtaining a connection identifier of a data packet; determining a server program used for processing the data packet, wherein the server program includes multiple worker threads, and QUIC protocol stacks run in the worker threads; determining a corresponding worker thread from the multiple worker threads based on the connection identifier; and distributing the data packet to the corresponding worker thread to make a QUIC protocol stack on the corresponding worker thread process the data packet.

According to an embodiment of the present disclosure, the above determining a corresponding worker thread from the multiple worker threads based on the connection identifier includes: determining a thread number of the multiple worker threads; and determining the corresponding worker thread from the multiple worker threads based on the connection identifier and the thread number.

According to an embodiment of the present disclosure, the above determining the corresponding worker thread from the multiple worker threads based on the connection identifier and the thread number includes: performing a modulo operation on the connection identifier and the thread number to obtain a modulo result; and determining the worker thread corresponding to the modulo result from the multiple worker threads.

According to an embodiment of the present disclosure, the above determining a corresponding worker thread from the multiple worker threads based on the connection identifier includes: querying whether the connection identifier corresponds to any one of the multiple worker threads; and if the connection identifier does not correspond to any one of the multiple worker threads, determining the corresponding worker thread from the multiple worker threads.

According to an embodiment of the present disclosure, the above if the connection identifier does not correspond to any one of the multiple worker threads, determining the corresponding worker thread from the multiple worker threads includes: if the connection identifier does not correspond to any one of the multiple worker threads, determining a number of a first data packet corresponding to each of the multiple worker threads to obtain a plurality of numbers of the first data packet; determining a number of the first data packet with the smallest value from the plurality of the numbers of the first data packet; and determining the worker thread corresponding to the number of the first data packet with the smallest value from the multiple worker threads.

According to an embodiment of the present disclosure, the above if the connection identifier does not correspond to any one of the multiple worker threads, determining the corresponding worker thread from the multiple worker threads includes: if the connection identifier does not correspond to any one of the multiple worker threads, obtaining a preset weight of each of the multiple worker threads to obtain a plurality of preset weights; determining a number of a second data packet corresponding to each of the multiple worker threads to obtain a plurality of numbers of the second data packet; and determining the corresponding worker thread from the multiple worker threads based on the plurality of the preset weights and the plurality of the numbers of the second data packet.

According to an embodiment of the present disclosure, the above QUIC protocol stack is used to parse or package the data packet according to a QUIC protocol.

On another aspect of the present disclosure, a system of processing data based on QUIC protocol stack is provided, and the above system includes: an obtaining module, obtaining a connection identifier of a data packet; a first determining module, determining a server program used for processing the data packet, wherein the server program includes multiple worker threads, and QUIC protocol stacks run in the worker threads; a second determining module, determining a corresponding worker thread from the multiple worker threads based on the connection identifier; and a distributing module, distributing the data packet to the corresponding worker thread to make a QUIC protocol stack on the corresponding worker thread process the data packet.

According to an embodiment of the present disclosure, the above second determining module includes: a first determining unit, determining a thread number of the multiple worker threads; and a second determining unit, determining the corresponding worker thread from the multiple worker threads based on the connection identifier and the thread number.

According to an embodiment of the present disclosure, the above second determining module includes: an operation subunit, performing a modulo operation on the connection identifier and the thread number to obtain a modulo result; and a first determining subunit, determining the worker thread corresponding to the modulo result from the multiple worker threads.

According to an embodiment of the present disclosure, the above second determining module includes: a querying unit, querying whether the connection identifier corresponds to any one of the multiple worker threads; and a third determining unit, if the connection identifier does not correspond to any one of the multiple worker threads, determining the corresponding worker thread from the multiple worker threads.

According to an embodiment of the present disclosure, the above third determining unit includes: a second determining subunit, if the connection identifier does not correspond to any one of the multiple worker threads, determining a number of first data packet corresponding to each of the multiple worker threads to obtain a plurality of numbers of the first data packet; a third determining subunit, determining a number of the first data packet with the smallest value from the plurality of the numbers of the first data packet; and a fourth determining subunit, determining the worker thread corresponding to the number of the first data packet with the smallest value from the multiple worker threads.

According to an embodiment of the present disclosure, the above third determining unit includes: an obtaining subunit, if the connection identifier does not correspond to any one of the multiple worker threads, obtaining a preset weight of each of the multiple worker threads to obtain a plurality of preset weights; a fifth determining subunit, determining a number of a second data packet corresponding to each of the multiple worker threads to obtain a plurality of numbers of the second data packet; and a sixth determining subunit, determining the corresponding worker thread from the multiple worker threads based on the plurality of the preset weights and the plurality of the numbers of the second data packet.

According to an embodiment of the present disclosure, the above QUIC protocol stack is used to parse or package the data packet according to a QUIC protocol.

On another aspect of the present disclosure, a computing device is provided, which includes a memory, a processor, and computer programs that stored in the memory and operable on the processor, wherein when the computer programs are executed by the processor, steps of the method according to any one of claims above are realized.

On another aspect of the present disclosure, a computer-readable storage medium is provided, which stores computer programs that can be executed by a processor to implement steps of the method according to any one of claims above.

The method of processing data based on QUIC protocol stack provided in the present disclosure divides server programs used for processing the data packet into multiple different worker threads, and configures one QUIC protocol stack for each worker thread, when processing the data packet, first a connection identifier is assigned for the data packet, and then the corresponding worker thread is found through the connection identifier, so as to distribute the data packet to the corresponding worker thread, so that the QUIC protocol stack running on the corresponding worker thread can process the data packet. Since the embodiment of the present disclosure configures one QUIC protocol stack for each worker thread, each worker thread can independently use its own QUIC protocol stack to process the data packet at the same time, which makes full use of the multi-core characteristics of the CPU, the number of concurrent connections of the system is enhanced, and the defects of under-utilizing the multi-core characteristics of the CPU, a certain core of the CPU being overloaded and a very low number of concurrent connections caused by configuring a single QUIC protocol stack for the server in the prior art are avoided.

DETAILED DESCRIPTION OF ILLUSTRATIVE EMBODIMENTS

In order to make the purposes, technical solutions and advantages of the present disclosure clearer, the following further describes the present disclosure in detail with reference to the accompanying drawings and embodiments. It should be understood that the specific embodiments described herein are only used to explain the present disclosure, and not used to limit the present disclosure. Based on the embodiments in the present disclosure, all other embodiments obtained by those of ordinary skill in the art without creative work shall fall within the protection scope of the present disclosure.

Taking into account the defects of under-utilizing the multi-core characteristics of the CPU, a certain core of the CPU being overloaded and a very low number of concurrent connections caused by configuring a single QUIC protocol stack for the server in the prior art, the method of processing data based on QUIC protocol stack provided by the present disclosure divides server programs used for processing the data packet into multiple different worker threads, and configures one QUIC protocol stack for each worker thread, when processing the data packet, first a connection identifier is assigned for the data packet, and then the corresponding worker thread is found through the connection identifier, so as to distribute the data packet to the corresponding worker thread, so that the QUIC protocol stack running on the corresponding worker thread can process the data packet. Since the embodiment of the present disclosure configures one QUIC protocol stack for each worker thread, each worker thread can independently use its own QUIC protocol stack to process the data packet at the same time, which makes full use of the multi-core characteristics of the CPU, the number of concurrent connections of the system is enhanced.

Figure 1:
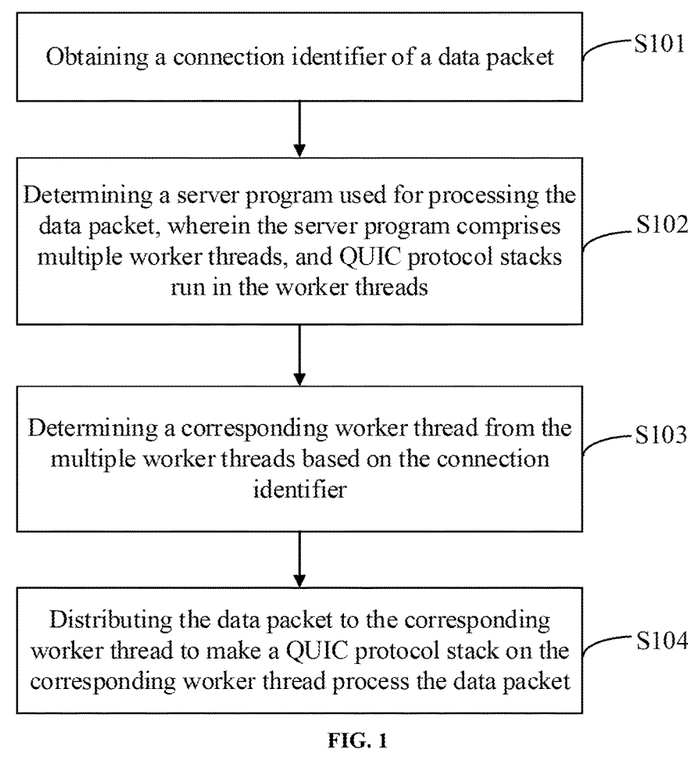
FIG. 1 schematically shows a flowchart of a method of processing data based on QUIC protocol stack according to an embodiment of the present disclosure.

FIG. 1 schematically shows a flowchart of a method of processing data based on QUIC protocol stack according to an embodiment of the present disclosure.

As shown in FIG. 1, the method of processing data based on QUIC protocol stack may include steps S101 to S104, wherein:

Step S101, obtaining a connection identifier of a data packet.

In the embodiment of the present disclosure, the data packet may include a UDP data packet, each data packet corresponds to a connection identifier, and connection identifiers corresponding to different data packets may be the same. Wherein, the connection identifier may include CID (also known as Connection ID).

Step S102, determining a server program used for processing the data packet, wherein the server program includes multiple worker threads, and QUIC protocol stacks run in the worker threads.

According to the embodiment of the present disclosure, the server program may be divided into multiple different worker threads in advance, a QUIC protocol stack can be configured for each worker thread, wherein the QUIC protocol stack is used to parse or package the data packet according to a QUIC protocol.

Step S103, determining a corresponding worker thread from the multiple worker threads based on the connection identifier.

In the embodiment of the present disclosure, there are three strategies to determine the corresponding worker thread from the multiple worker threads based on the connection identifier, details are as follows.

The first strategy, also known as a fixed mapping strategy, is specifically: determining a thread number of the multiple worker threads; and determining the corresponding worker thread from the multiple worker threads based on the connection identifier and the thread number. Wherein, the determining the corresponding worker thread from the multiple worker threads based on the connection identifier and the thread number may include: performing a modulo operation on the connection identifier and the thread number to obtain a modulo result; and determining the worker thread corresponding to the modulo result from the multiple worker threads.

For example, if the connection identifier is 9, the thread number is 10, and the modulo result is 9, the 9th worker thread may be taken as the corresponding worker thread.

For another example, each worker thread is preset with a mapping identifier, and the mapping identifier of the fourth worker thread is 9, and as for the modulo result is 9, which exactly corresponds to the mapping identifier 9, the fourth worker thread may be taken as the corresponding worker thread.

Since the connection identifier is randomly assigned, if an assignment of the connection identifier is lack of balance, the first strategy may lead to high load of some worker threads and low load of some worker threads. In order to solve the above problems, a second strategy can be adopted, also known as a load balancing mapping strategy, which is specifically: querying whether the connection identifier corresponds to any one of the multiple worker threads; and if the connection identifier does not correspond to any one of the multiple worker threads, determining the corresponding worker thread from the multiple worker threads. Wherein, if the connection identifier does not correspond to any one of the multiple worker threads, determining the corresponding worker thread from the multiple worker threads may include: if the connection identifier does not correspond to any one of the multiple worker threads, determining a number of a first data packet corresponding to each of the multiple worker threads to obtain a plurality of numbers of the first data packet; determining a number of the first data packet with the smallest value from the plurality of the numbers of the first data packet; and determining the worker thread corresponding to the number of the first data packet with the smallest value from the multiple worker threads.

It should be noted that regardless of strategy, a fixed mechanism needs to be satisfied, that is, for the connection identifier that has been matched, the data packet corresponding to the connection identifier must be allocated to the worker thread that successfully matches the connection identifier subsequently. For example, for the connection identifier 9, the data packet corresponding to the connection identifier 9 has been sent to the 9th worker thread before, and the data packet with the connection identifier 9 that will appear in the future also needs to be distributed to the 9th worker thread. If the strategy described in the present disclosure does not satisfy the above mechanism, it may appears that the data packet corresponding to the same connection identifier may be distributed to different worker threads, which will inevitably lead to a failure of some data packet connections, thereby increasing the load and retransmission ratio. Using the mechanism described in the present disclosure can avoid the above-mentioned defects and reduce the load and retransmission ratio.

According to the embodiment of the present disclosure, if the connection identifier of the current data packet does not match any worker thread before, the number of the first data packet of the data packet corresponding to each worker thread can be determined first, and then the number of the first data packet with the smallest value can be found, and the worker thread corresponding to the number of the first data packet with the smallest value is taken as the worker thread corresponding to the current connection identifier.

For example, there are 3 worker threads. Assuming that the connection identifier has not matched any worker thread before, and the number of the first data packet of the data packet corresponding to the first worker thread is 4, the number of the first data packet of the data packet corresponding to the second worker thread is 2, the number of the first data packet of the data packet corresponding to the third worker thread is 5, then the second worker thread can be taken as the worker thread corresponding to the connection identifier.

The third strategy, as a special case of the second strategy, is also called a weight mapping strategy. Specifically, the third strategy can also be first querying whether the connection identifier corresponds to any one of the multiple worker threads; and if the connection identifier does not correspond to any one of the multiple worker threads, determining the corresponding worker thread from the multiple worker threads. Wherein if the connection identifier does not correspond to any one of the multiple worker threads, determining the corresponding worker thread from the multiple worker threads may include: if the connection identifier does not correspond to any one of the multiple worker threads, obtaining a preset weight of each of the multiple worker threads to obtain a plurality of preset weights; determining a number of a second data packet corresponding to each of the multiple worker threads to obtain a plurality of numbers of the second data packet; and determining the corresponding worker thread from the multiple worker threads based on the plurality of the preset weights and the plurality of the numbers of the second data packet.

For example, there are 3 worker threads. Assuming that the connection identifier has not matched any worker thread before, the preset weight of the first worker thread is 1, the number of the second data packet of corresponding data packet is 3; the preset weight of the second worker thread is 2, the number of the second data packet of corresponding data packet is 4; the preset weight of the third worker thread is 3, the number of the second data packet of corresponding data packet is 6. In order to make the ratio of the number of the second data packet of the data packet corresponding to each worker thread can be maintained at the respective preset weight ratio, that is, 1:2:3, the data packet can be delivered on worker threads other than the first worker thread as much as possible, that is, either the second worker thread or the third worker thread can be taken as the worker thread corresponding to the connection identifier.

Step S104, distributing the data packet to the corresponding worker thread to make a QUIC protocol stack on the corresponding worker thread process the data packet.

In the embodiment of the present disclosure, distributing the data packet to the corresponding worker thread may actually distributing the data packet to the QUIC protocol station stack on the worker thread, so that the QUIC protocol stack can parse or package the data packet according to a QUIC protocol, wherein the data packet processed by the QUIC protocol stack can be called a QUIC data packet.

The method of processing data based on QUIC protocol stack provided in the present disclosure divides server programs used for processing the data packet into multiple different worker threads, and configures one QUIC protocol stack for each worker thread, when processing the data packet, first a connection identifier is assigned for the data packet, and then the corresponding worker thread is found through the connection identifier, so as to distribute the data packet to the corresponding worker thread, so that the QUIC protocol stack running on the corresponding worker thread can process the data packet. Since the embodiment of the present disclosure configures one QUIC protocol stack for each worker thread, each worker thread can independently use its own QUIC protocol stack to process the data packet at the same time, which makes full use of the multi-core characteristics of the CPU, the number of concurrent connections of the system is enhanced, and the defects of under-utilizing the multi-core characteristics of the CPU, a certain core of the CPU being overloaded and a very low number of concurrent connections caused by configuring a single QUIC protocol stack for the server in the prior art are avoided.

Figure 2:
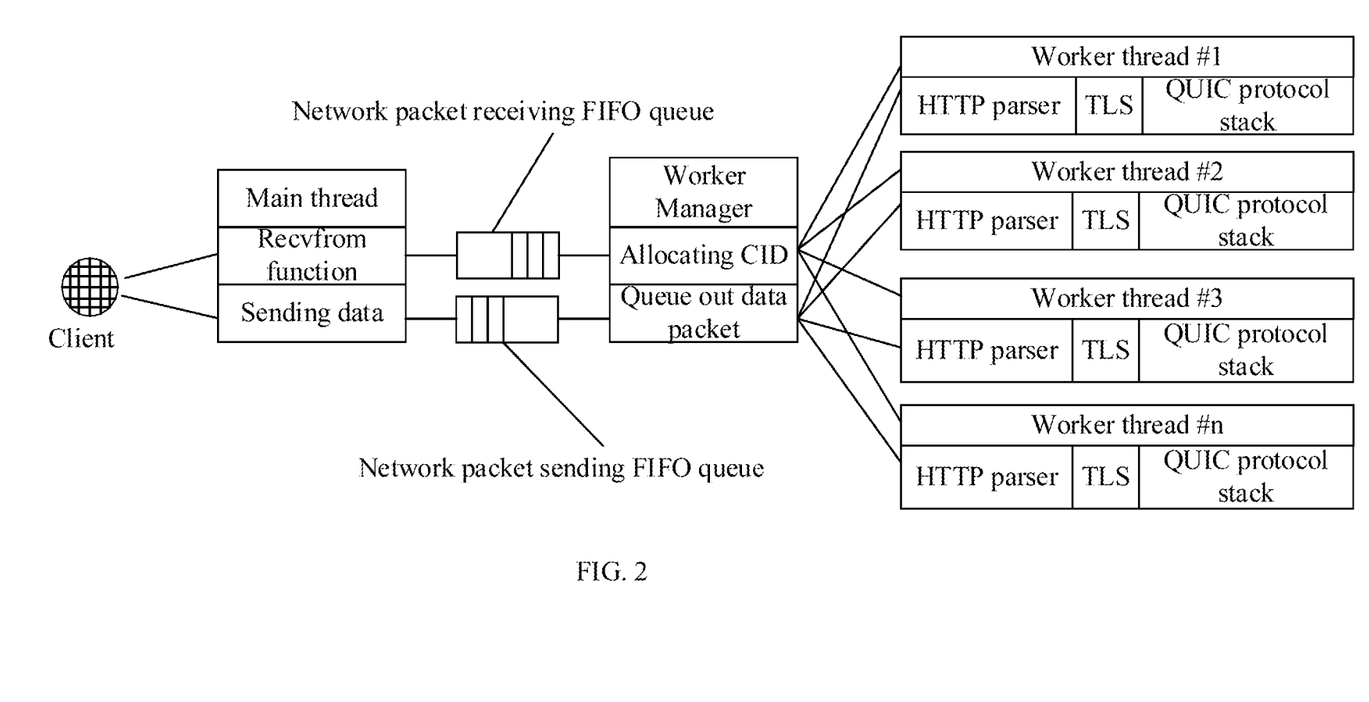
FIG. 2 schematically shows a schematic diagram of a data processing solution based on QUIC protocol stack according to an embodiment of the present disclosure.

FIG. 2 schematically shows a schematic diagram of a data processing solution based on QUIC protocol stack according to an embodiment of the present disclosure.

As shown in FIG. 2, the embodiment of the present disclosure can receive the data packet (such as the UDP data packet) from a client through a function of Recvfrom on a main thread, and then arrange the data packet in order in a network packet receiving FIFO (also known as First Input First Output) queue, further allocate the CID through the Worker Manager, and then determine the corresponding worker thread through ally one of the strategies ill the above-mentioned embodiments, and deliver the data packet on the worker thread. As can be seen from FIG. 3, each worker thread runs HTTP parser, TLS (Transport Layer Security, also known as the Transport Layer Security Protocol), and the QUIC protocol stack. Wherein, the HTTP parser can provide the parsing function of requesting and responsing messages, the purpose of TLS is to provide security and data integrity guarantee for Internet communications, and the QUIC protocol stack is used to parse or package the data packet according to the QUIC protocol. Taking the UDP data packet as an example, for a delivered UDP packet, it can be processed by the QUIC protocol stack to be parsed into the QUIC data packet. Then the QUIC data packet are passed through TLS, and finally parsed by the HTTP parser and then sent to the system for processing. Further, for the data that the system needs to send out, it can be packaged into the QUIC data packet through the HTTP parser, TLS, and the QUIC protocol stack of the worker thread in order, and then queued out, and then sent to the client by the main thread through a network packet sending FIFO queue in turn.

Figure 3:
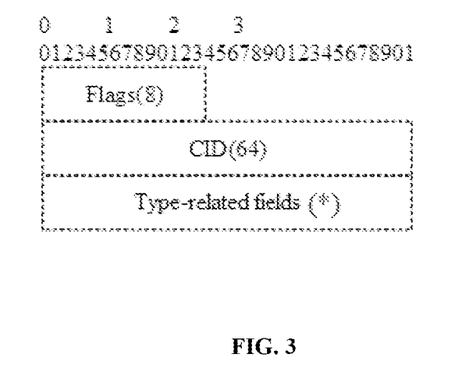
FIG. 3 schematically shows a structure diagram of a QUIC data packet according to an embodiment of the present disclosure.

FIG. 3 schematically shows a structure diagram of a QUIC data packet according to an embodiment of the present disclosure.

As shown in FIG. 3, Flags occupy 8 bits, which can be used to represent the flag bits of the QUIC data packet. For example, Flags can be used to indicate that the QUIC data packet is a connection establishment data packet or a handshake data packet. Connection ID occupies 64 bits and can be used to represent a network connection. Type-Dependent Fields can correspondingly store different structures according to the data packet represented by Flags. For example, if Flags are used to indicate that the QUIC data packet is the connection establishment data packet, the Type-Dependent Fields can store the data structure related to the connection establishment. Wherein, (*) can indicate that the Type-Dependent Fields do not necessarily exist in the QUIC data packet.

Figure 4:
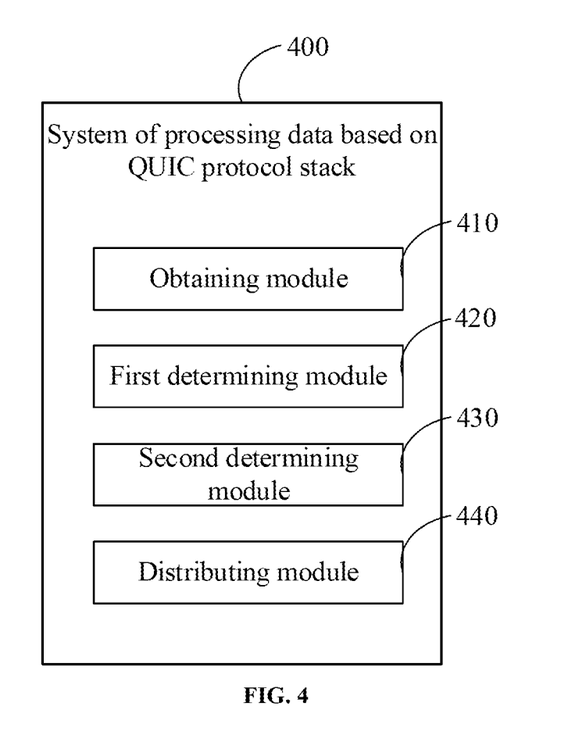
FIG. 4 schematically shows a block diagram of a system of processing data based on QUIC protocol stack according to an embodiment of the present disclosure.

FIG. 4 schematically shows a block diagram of a system of processing data based on QUIC protocol stack according to an embodiment of the present disclosure.

As shown in FIG. 4, the system of processing data based on QUIC protocol stack 400 may include an obtaining module 410, a first determining module 420, a second determining module 430, and a distributing module 440, wherein:

The obtaining module 410, is for obtaining a connection identifier of a data packet.

The first determining module 420, is for determining a server program used for processing the data packet, wherein the server program includes multiple worker threads, and QUIC protocol stacks run in the worker threads.

The second determining module 430, is for determining a corresponding worker thread from the multiple worker threads based on the connection identifier.

The distributing module 440, is for distributing the data packet to the corresponding worker thread to make the QUIC protocol stack on the corresponding worker thread process the data packet.

The system of processing data based on QUIC protocol stack provided in the present disclosure divides server programs used for processing the data packet into multiple different worker threads, and configures one QUIC protocol stack for each worker thread, when processing the data packet, first a connection identifier is assigned for the data packet, and then the corresponding worker thread is found through the connection identifier, so as to distribute the data packet to the corresponding worker thread, so that the QUIC protocol stack running on the corresponding worker thread can process the data packet. Since the embodiment of the present disclosure configures one QUIC protocol stack for each worker thread, each worker thread can independently use its own QUIC protocol stack to process the data packet at the same time, which makes full use of the multi-core characteristics of the CPU, the number of concurrent connections of the system is enhanced, and the defects of under-utilizing the multi-core characteristics of the CPU, a certain core of the CPU being overloaded and a very low number of concurrent connections caused by configuring a single QUIC protocol stack for the server in the prior art are avoided.

As an optional embodiment, the second determining module may include: a first determining unit, determining a thread number of the multiple worker threads; and a second determining unit, determining the corresponding worker thread from the multiple worker threads based on the connection identifier and the thread number.

As an optional embodiment, the second determining module may include: an operation subunit, performing a modulo operation on the connection identifier and the thread number to obtain a modulo result; and a first determining subunit, determining the worker thread corresponding to the modulo result from the multiple worker threads.

As an optional embodiment, the second determining module may include: a querying unit, querying whether the connection identifier corresponds to any one of the multiple worker threads; and a third determining unit, if the connection identifier does not correspond to any one of the multiple worker threads, determining the corresponding worker thread from the multiple worker threads.

As an optional embodiment, the third determining unit may include: a second determining subunit, if the connection identifier does not correspond to any one of the multiple worker threads, determining a number of a first data packet corresponding to each of the multiple worker threads to obtain a plurality of numbers of the first data packet; a third determining subunit, determining a number of the first data packet with the smallest value from the plurality of the numbers of the first data packet; and a fourth determining subunit, determining the worker thread corresponding to the number of the first data packet with the smallest value from the multiple worker threads.

As an optional embodiment, the third determining unit may include: an obtaining subunit, if the connection identifier does not correspond to any one of the multiple worker threads, obtaining a preset weight of each of the multiple worker threads to obtain a plurality of preset weights; a fifth determining subunit, determining a number of a second data packet corresponding to each of the multiple worker threads to obtain a plurality of numbers of the second data packet; and a sixth determining subunit, determining the corresponding worker thread from the multiple worker threads based on the plurality of the preset weights and the plurality of the numbers of the second data packet.

As an optional embodiment, the QUIC protocol stack is used to parse or package the data packet according to a QUIC protocol.

Figure 5:
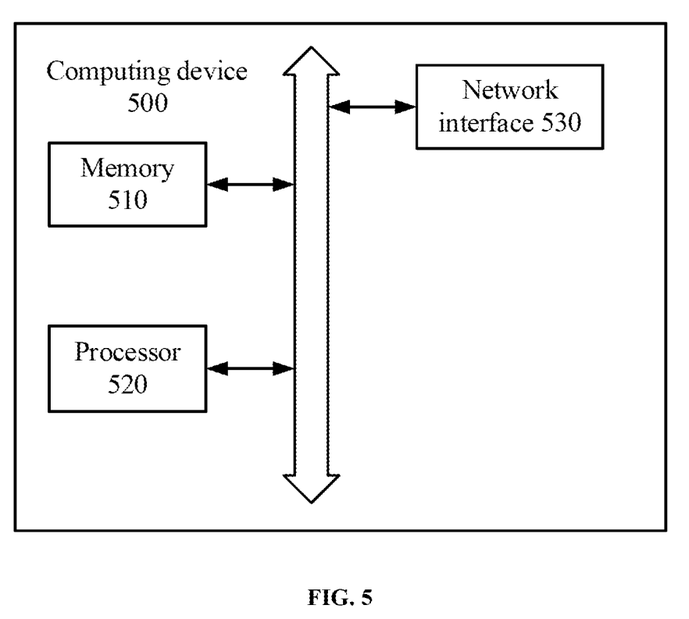
FIG. 5 schematically shows a schematic diagram of hardware architecture of a computing device suitable for implementing the method of processing data based on QUIC protocol stack according to an embodiment of the present disclosure.

FIG. 5 schematically shows a schematic diagram of hardware architecture of a computing device suitable for implementing a method of processing data based on QUIC protocol stack according to an embodiment of the present disclosure. In the embodiment, the computing device 500 is a device that can automatically perform numerical calculation and/or information processing according to pre-set or stored instructions. For example, it can be a smart phone, a tablet computer, a notebook computer, a desktop computer, a rack server, a blade server, a tower server or a cabinet server (which includes an independent server or a server cluster composed of multiple servers). As shown in FIG. 5, the computing device 500 at least includes but is not limited to: a memory 510, a processor 520, and a network interface 530 that can communicate with each other through a system bus. Wherein:

The memory 510 includes at least one type of computer-readable storage medium. The readable storage medium includes a flash memory, a hard disk, a multimedia card, a card type memory (such as SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical dis and so on. In some embodiments, the memory 510 may be an internal storage module of the computing device 500 such as a hard disk or memory of the computing device 500. In other embodiments, the memory 510 may also be an external storage device of the computing device 500, such as a plugged hard disk provided in the computing device 500, a Smart Media Card (SMC), Secure Digital (SD) card, a flash memory card, and so on. Of course, the memory 510 may also include both an internal storage module and an external storage device of the computing device 500. In the embodiment, the memory 510 is generally used to store an operating system and various types of application software installed in the computing device 500 such as program codes of a method of processing data based on QUIC protocol stack and the like. In addition, the memory 510 may also be used to temporarily store various types of data that have been or will be outputted.

The processor 520, in some embodiments, may be a Central Processing Unit (CPU), a controller, a microcontroller, a microprocessor, or other data processing chips. The processor 520 is generally used to control the overall operation of the computing device 500 such as performing control and processing related to data interaction or communication with the computing device 500. In the embodiment, the processor 520 is used to run program codes stored in the memory 510 or process data.

The network interface 530 may include a wireless network interface or a wired network interface which is generally used to establish a communication connection between the computing device 500 and other computing devices. For example, the network interface 530 is used to connect the computing device 500 to an external terminal via a network, and to establish a data transmission channel and a communication link between the computing device 500 and external terminals. The network can be Intranet, Internet, Global System of Mobile communication (GSM), Wideband Code Division Multiple Access (WCDMA), 4G network, 5G network, Bluetooth, Wi-Fi and other wireless or wired networks.

It should be pointed out that FIG. 5 only shows the computing device 500 with components 510-530, but it should be understood that it is not required to implement all the illustrated components, and more or fewer components may be implemented instead.

In the embodiment, the method of processing data based on QUIC protocol stack stored in the memory 510 can also be divided into one or more program modules, which are executed by one or more processors (in the embodiment, referring to the processor 520) to complete the present invention.

The embodiment also provides a computer-readable storage medium, which stores computer programs that can be executed by a processor to implement steps of the method of processing data based on QUIC protocol stack.

In the embodiment, the computer-readable storage medium includes a flash memory, a hard disk, a multimedia card, a card-type memory (such as SD or DX memory and so on), a Random Access Memory (RAM), a Static Random Access Memory (SRAM), a Read Only Memory (ROM), an Electrically Erasable Programmable Read-Only Memory (EEPROM), a Programmable Read-Only Memory (PROM), a magnetic memory, a magnetic disks, an optical disks and so on. In some embodiments, the computer-readable storage medium may be an internal storage unit of a computing device, such as a hard disk or memory of the computing device. In other embodiments, the computer-readable storage medium may also be an external storage device of the computing device, such as a plug-in hard disk, a smart memory card (which is abbreviated as SMC), and a secure digital (which is abbreviated as SD) card, a flash card and so on. Of course, the computer-readable storage medium may also include both the internal storage unit and the external storage device of the computing device. In the embodiment, the computer-readable storage medium is generally used to store the operating system and various application software installed in the computing device, such as the program code of the method of processing data based on QUIC protocol stack in the embodiment. In addition, the computer-readable storage medium can also be used to temporarily store various types of data that have been output or will be output.

Obviously, those skilled in the art should understand that the modules or steps of the above-mentioned embodiments of the present invention can be implemented by a general computing device, and they can be concentrated on a single computing device, or distributed among multiple computing devices. Optionally, they can be implemented with program codes executable by a computing device, so that they can be stored in a storage device for execution by the computing device, and in some cases, the steps shown or described can be performed in a different order than here, or they are respectively fabricated into individual integrated circuit modules, or multiple modules or steps are fabricated into a single integrated circuit module to achieve. In this way, the embodiments of the present invention are not limited to any specific combination of hardware and software.

The above are only the preferred embodiments of the present invention, and do not limit the scope of the present invention. Any equivalent structure or equivalent process transformation made using the content of the description and drawings of the present invention, or directly or indirectly applied to other related technical fields, is included in the scope of patent protection of the present invention in the same reason.

What is claimed is:

1. A method of processing data based on QUIC (Quick UDP Internet Connection) protocol stack, comprising:
   obtaining a connection identifier of a data packet among a plurality of data packets;
   determining a server program used for processing the plurality of data packets, wherein the server program comprises a plurality of worker threads, and a plurality of QUIC protocol stacks run in the plurality of worker threads, respectively;
   determining a corresponding worker thread among the plurality of worker threads based on the connection identifier; and
   distributing the data packet to the corresponding worker thread and processing the data packet by one of the plurality of QUIC protocol stacks running in the corresponding worker thread.

2. The method of claim 1, wherein the determining a corresponding worker thread among the plurality of worker threads based on the connection identifier comprises:
   determining a thread number of the plurality of worker threads; and
   determining the corresponding worker thread among the plurality of worker threads based on the connection identifier and the thread number.

3. The method of claim 2, wherein the determining the corresponding worker thread among the plurality of worker threads based on the connection identifier and the thread number comprises:
   performing a modulo operation on the connection identifier and the thread number to obtain a modulo result; and
   determining the corresponding worker thread among the plurality of worker threads based on the modulo result.

4. The method of claim 1, wherein the determining a corresponding worker thread among the plurality of worker threads based on the connection identifier comprises:
   querying whether the connection identifier corresponds to any one of the plurality of worker threads; and
   in response to determining that the connection identifier does not correspond to any one of the plurality of worker threads, determining the corresponding worker thread among the plurality of worker threads.

5. The method of claim 4, wherein the in response to determining that the connection identifier does not correspond to any one of the plurality of worker threads, determining the corresponding worker thread among the plurality of worker threads comprises:
   in response to determining that the connection identifier does not correspond to any one of the plurality of worker threads, determining a number of a first data packet distributed to each of the plurality of worker threads to obtain a plurality of numbers of the first data packet;
   determining a number of the first data packet with a smallest value among the plurality of the numbers of the first data packet; and
   determining the corresponding worker thread among the plurality of worker threads based on the number of the first data packet with the smallest value.

6. The method of claim 4, wherein the in response to determining that the connection identifier does not correspond to any one of the plurality of worker threads, determining the corresponding worker thread among the plurality of worker threads comprises:
   in response to determining that the connection identifier does not correspond to any one of the plurality of worker threads, obtaining a predetermined weight of each of the plurality of worker threads to obtain a plurality of predetermined weights;
   determining a number of a second data packet distributed to each of the plurality worker threads to obtain a plurality of numbers of the second data packet; and
   determining the corresponding worker thread among the plurality of worker threads based on the plurality of the predetermined weights and the plurality of the numbers of the second data packet.

7. The method of claim 1, further comprising:
parsing or packaging the data packet based on a QUIC protocol by the one of the plurality of QUIC protocol stacks running in the corresponding worker thread.

8. A computing device, comprising a memory, a processor, and computer programs stored in the memory and operable on the processor, wherein the computer programs upon execution by the processor cause the processor to perform operations comprising:
obtaining a connection identifier of a data packet among a plurality of data packets;
determining a server program used for processing the plurality of data packets, wherein the server program comprises a plurality of worker threads, and a plurality of QUIC protocol stacks run in the plurality of worker threads, respectively;
determining a corresponding worker thread among the plurality of worker threads based on the connection identifier; and
distributing the data packet to the corresponding worker thread and processing the data packet by one of the plurality of QUIC protocol stacks running in the corresponding worker thread.

9. The computing device of claim 8, wherein the determining a corresponding worker thread among the plurality of worker threads based on the connection identifier comprises:
determining a thread number of the plurality of worker threads; and
determining the corresponding worker thread among the plurality of worker threads based on the connection identifier and the thread number.

10. The computing device of claim 9, wherein the determining the corresponding worker thread among the plurality of worker threads based on the connection identifier and the thread number comprises:
performing a modulo operation on the connection identifier and the thread number to obtain a modulo result; and
determining the corresponding worker thread among the plurality of worker threads based on the modulo result.

11. The computing device of claim 8, wherein the determining a corresponding worker thread among the plurality of worker threads based on the connection identifier comprises:
querying whether the connection identifier corresponds to any one of the plurality of worker threads; and
in response to determining that the connection identifier does not correspond to any one of the plurality of worker threads, determining the corresponding worker thread among the plurality of worker threads.

12. The computing device of claim 11, wherein the in response to determining that the connection identifier does not correspond to any one of the plurality of worker threads, determining the corresponding worker thread among the plurality of worker threads comprises:
in response to determining that the connection identifier does not correspond to any one of the plurality of worker threads, determining a number of a first data packet distributed to each of the plurality of worker threads to obtain a plurality of numbers of the first data packet;
determining a number of the first data packet with a smallest value among the plurality of numbers of the first data packet; and
determining the corresponding worker thread among the plurality of worker threads based on the number of the first data packet with the smallest value.

13. The computing device of claim 11, wherein the in response to determining that the connection identifier does not correspond to any one of the plurality of worker threads, determining the corresponding worker thread among the plurality of worker threads comprises:
in response to determining that the connection identifier does not correspond to any one of the plurality of worker threads, obtaining a predetermined weight of each of the plurality of worker threads to obtain a plurality of predetermined weights;
determining a number of a second data packet distributed to each of the plurality worker threads to obtain a plurality of numbers of the second data packet; and
determining the corresponding worker thread among the plurality of worker threads based on the plurality of the predetermined weights and the plurality of the numbers of the second data packet.

14. A non-transitory computer-readable storage medium, storing computer-readable instructions, wherein the computer-readable instructions upon execution by a processor cause the processor to perform operations comprising:
obtaining a connection identifier of a data packet among a plurality of data packets;
determining a server program used for processing the plurality of data packets, wherein the server program comprises a plurality of worker threads, and a plurality of QUIC protocol stacks nm in the plurality of worker threads, respectively;
determining a corresponding worker thread among the plurality of worker threads based on the connection identifier; and
distributing the data packet to the corresponding worker thread and processing the data packet by one of the plurality of QUIC protocol stacks running in the corresponding worker thread.

15. The non-transitory computer-readable storage media of claim 14, wherein the determining a corresponding worker thread among the plurality of worker threads based on the connection identifier comprises:
determining a thread number of the plurality of worker threads; and
determining the corresponding worker thread among the plurality of worker threads based on the connection identifier and the thread number.

16. The non-transitory computer-readable storage media of claim 15, wherein the determining the corresponding worker thread among the plurality of worker threads based on the connection identifier and the thread number comprises:
performing a modulo operation on the connection identifier and the thread number to obtain a modulo result; and
determining the corresponding worker thread among the plurality of worker threads based on the modulo result.

17. The non-transitory computer-readable storage media of claim 14, wherein the determining a corresponding worker thread among the plurality of worker threads based on the connection identifier comprises:
querying whether the connection identifier corresponds to any one of the plurality of worker threads; and
in response to determining that the connection identifier does not correspond to any one of the plurality of worker threads, determining the corresponding worker thread among the plurality of worker threads.

18. The non-transitory computer-readable storage media of claim 17, wherein the in response to determining that the connection identifier does not correspond to any one of the plurality of worker threads, determining the corresponding worker thread among the plurality of worker threads comprises:

in response to determining that the connection identifier does not correspond to any one of the plurality of worker threads, determining a number of a first data packet distributed to each of the plurality of worker threads to obtain a plurality of numbers of the first data packet; determining a number of the first data packet with a smallest value among the plurality of the numbers of the first data packet; and determining the corresponding worker thread among the plurality of worker threads based on the number of the first data packet with the smallest value.

19. The non-transitory computer-readable storage media of claim 17, wherein the in response to determining that the connection identifier does not correspond to any one of the plurality of worker threads, determining the corresponding worker thread among the plurality of worker threads comprises:

in response to determining that the connection identifier does not correspond to any one of the plurality of worker threads, obtaining a predetermined weight of each of the plurality of worker threads to obtain a plurality of predetermined weights;

determining a number of a second data packet distributed to each of the plurality worker threads to obtain a plurality of numbers of the second data packet; and determining the corresponding worker thread among the plurality of worker threads based on the plurality of the predetermined weights and the plurality of the numbers of the second data packet.

20. The computing device of claim 8, the operations further comprising:

parsing or packaging the data packet based on a QUIC protocol by the one of the plurality of QUIC protocol stacks running in the corresponding worker thread.

* * * * *